US008055273B1

(12) United States Patent
Rai et al.

(10) Patent No.: US 8,055,273 B1
(45) Date of Patent: Nov. 8, 2011

(54) METHOD AND SYSTEM FOR DEFINING A SEARCH WINDOW BASED ON A MOBILE STATION'S DIRECTION OF MOTION AND SPEED

(75) Inventors: Deveshkumar Rai, Overland Park, KS (US); Manoj Shetty, Overland Park, KS (US); Sachin R. Vargantwar, Overland Park, KS (US); Siddharth S. Oroskar, Overland Park, KS (US); Debasish Sarkar, Irvine, CA (US)

(73) Assignee: Sprint Spectrum L.P., Overland Park, KS (US)

( * ) Notice: Subject to any disclaimer, the term of this patent is extended or adjusted under 35 U.S.C. 154(b) by 696 days.

(21) Appl. No.: 12/027,667

(22) Filed: Feb. 7, 2008

(51) Int. Cl.
*H04Q 7/20* (2006.01)
(52) U.S. Cl. ............... 455/456.1; 370/335; 709/227
(58) Field of Classification Search .......... 370/335; 709/227; 342/387
See application file for complete search history.

(56) References Cited

U.S. PATENT DOCUMENTS

| | | | | |
|---|---|---|---|---|
| 5,577,022 A * | 11/1996 | Padovani et al. | | 370/332 |
| 6,188,354 B1 * | 2/2001 | Soliman et al. | | 342/387 |
| 6,204,812 B1 * | 3/2001 | Fattouche | | 342/457 |
| 6,321,090 B1 * | 11/2001 | Soliman | | 455/440 |
| 6,542,743 B1 | 4/2003 | Soliman | | |
| 6,549,545 B1 | 4/2003 | Yamamoto et al. | | |
| 6,580,749 B1 | 6/2003 | Miura | | |
| 6,775,252 B1 | 8/2004 | Bayley | | |
| 7,020,180 B2 | 3/2006 | Challa et al. | | |
| 7,236,796 B2 * | 6/2007 | Soliman | | 455/456.1 |
| 7,391,759 B2 * | 6/2008 | Wallace et al. | | 370/350 |
| 2001/0006514 A1 * | 7/2001 | Park | | 370/331 |
| 2003/0214436 A1 * | 11/2003 | Voor et al. | | 342/418 |
| 2004/0131032 A1 * | 7/2004 | Sendonaris et al. | | 370/335 |
| 2004/0233874 A1 * | 11/2004 | Baker | | 370/335 |
| 2005/0020264 A1 * | 1/2005 | Akao et al. | | 455/436 |
| 2009/0125630 A1 * | 5/2009 | Gogic | | 709/227 |

FOREIGN PATENT DOCUMENTS

EP 1107483 A1 * 6/2001

* cited by examiner

*Primary Examiner* — Charles Shedrick

(57) ABSTRACT

A mobile station receives a target pilot signal transmitted by a target transmitter in a spread spectrum communication system and measures its phase. The mobile station then defines a search window to search for the target pilot signal at a later time. The mobile station defines the center point of the search window based on the previously-measured phase and the mobile station's direction of motion and speed relative to the target transmitter. If the mobile station is moving toward the target transmitter, the center point is less than the previously-measured phase by an adjustment amount. If the mobile station is moving away from the target transmitter, the center point is greater than the previously-measured phase by an adjustment amount. The adjustment amount may depend on the mobile station's speed. After the search window is defined, the mobile station uses the search window to search for the target pilot signal.

19 Claims, 3 Drawing Sheets

METHOD AND SYSTEM FOR DEFINING A SEARCH WINDOW BASED ON A MOBILE STATION'S DIRECTION OF MOTION AND SPEED

BACKGROUND

Spread spectrum communications are commonly used in cellular networks that provide wireless service to mobile stations, such as wireless telephones. Such cellular networks typically operate in accordance with IS-95 CDMA or cdma2000 standards.

The signals transmitted by base stations in a spread spectrum communication system are spread by a pseudonoise (PN) sequence. For example, in accordance with IS-95 CDMA standards, the pilot signal transmitted by a base station is spread by a "short" PN sequence at a chipping rate of 1.2288 MHz, and the "short" PN sequence repeats itself every 26.67 milliseconds. With this chipping rate, one "chip" is approximately 0.8138 microseconds.

Each pilot signal transmitted by a spread spectrum communication system may be spread by the same short PN sequence but with a different phase or "PN offset." In particular, the beginning of a PN sequence used to spread a pilot signal may occur at a particular time offset relative to a reference time, according to the time used by the spread spectrum communication system. The "PN offset" of the signal may then correspond to this particular time offset.

In accordance with IS-95 CDMA standards, each PN offset is defined by an index that is an integer in the range of 0 through 511. The actual PN offset is then found by multiplying its index by 64 chips. Thus, a PN offset of "0" means that the PN sequence begins at the reference time. A PN offset of "1" means that the PN sequence begins 64 chips after the reference time. A PN offset of "2" means that the PN sequence begins 128 chips after the reference time, etc. In this way, different pilot signals may be distinguished by their PN offsets.

As noted above, the PN offset of a pilot signal is defined with respect to a reference time according to the system's time. However, when the pilot signal is received by a mobile station, the mobile station may measure a different PN offset. The difference between the PN offset transmitted by a base station (the nominal PN offset) and the PN offset measured by the mobile station (the measured PN offset) can arise due to a transmission delay associated with the pilot signal.

The transmission delay can be a function of the distance between the base station's antenna and the mobile station. For example, a pilot signal will travel approximately 244 meters in one chip (assuming that one chip is 0.8138 microseconds). Thus, it takes about 6.6 chips for a pilot signal to travel one mile. This means that if the mobile station is trying to detect a pilot signal from a target base station that is one mile away, the mobile station will measure a PN offset that is 6.6 chips greater than the nominal PN offset of the target base station's pilot signal (assuming that the mobile station's time is perfectly synchronized with the system's time).

Once a mobile station has found a target pilot signal and has measured its PN offset, the mobile station may continue to monitor the target pilot signal. While monitoring the target pilot signal, the mobile station may subsequently measure a PN offset for the target pilot signal that is either greater than before (e.g., if the mobile station is moving away from the target base station) or less than before (e.g., if the mobile station is moving toward the base station). Because of the possibility of subsequently measuring an increased or decreased PN offset for the target pilot signal, the mobile station typically monitors the target pilot signal using a search window that is centered on a previously-measured PN offset. The width (in chips) of the search window is typically specified by a width parameter that the mobile station receives from the spread spectrum communication system. In this way, the mobile station may continue to track the target pilot signal when the mobile station changes its distance from the target base station, so long as the target pilot signal's PN offset at the mobile station remains within the range of PN offsets specified by the search window.

OVERVIEW

In a first principal aspect, an exemplary embodiment provides a method of searching for a target spread spectrum signal transmitted by a target transmitter in a spread spectrum communication system. The target spread spectrum signal has a previously-measured phase at a mobile station. In accordance with the method, a direction of motion of the mobile station relative to the target transmitter is determined. A search window is defined, based on at least the direction of motion and the previously-measured phase. The mobile station searches for a spread spectrum signal having a phase at the mobile station that is within the search window.

In a second principal aspect, an exemplary embodiment provides a mobile station. The mobile station comprises a communication receiver for receiving spread spectrum signals, a processor, data storage, and a plurality of program instructions stored in the data storage. The program instructions are executable by the processor to perform the steps of: (a) determining a direction of motion of the mobile station relative to a target transmitter; (b) defining a search window, wherein the search window is defined based on at least the direction of motion and a previously-measured phase of a target spread spectrum signal transmitted by the target transmitter; and (c) controlling the communication receiver to search for a spread spectrum signal having a phase at the mobile station that is within the search window.

DETAILED DESCRIPTION OF EXEMPLARY EMBODIMENTS

1. Introduction

Figure 1:
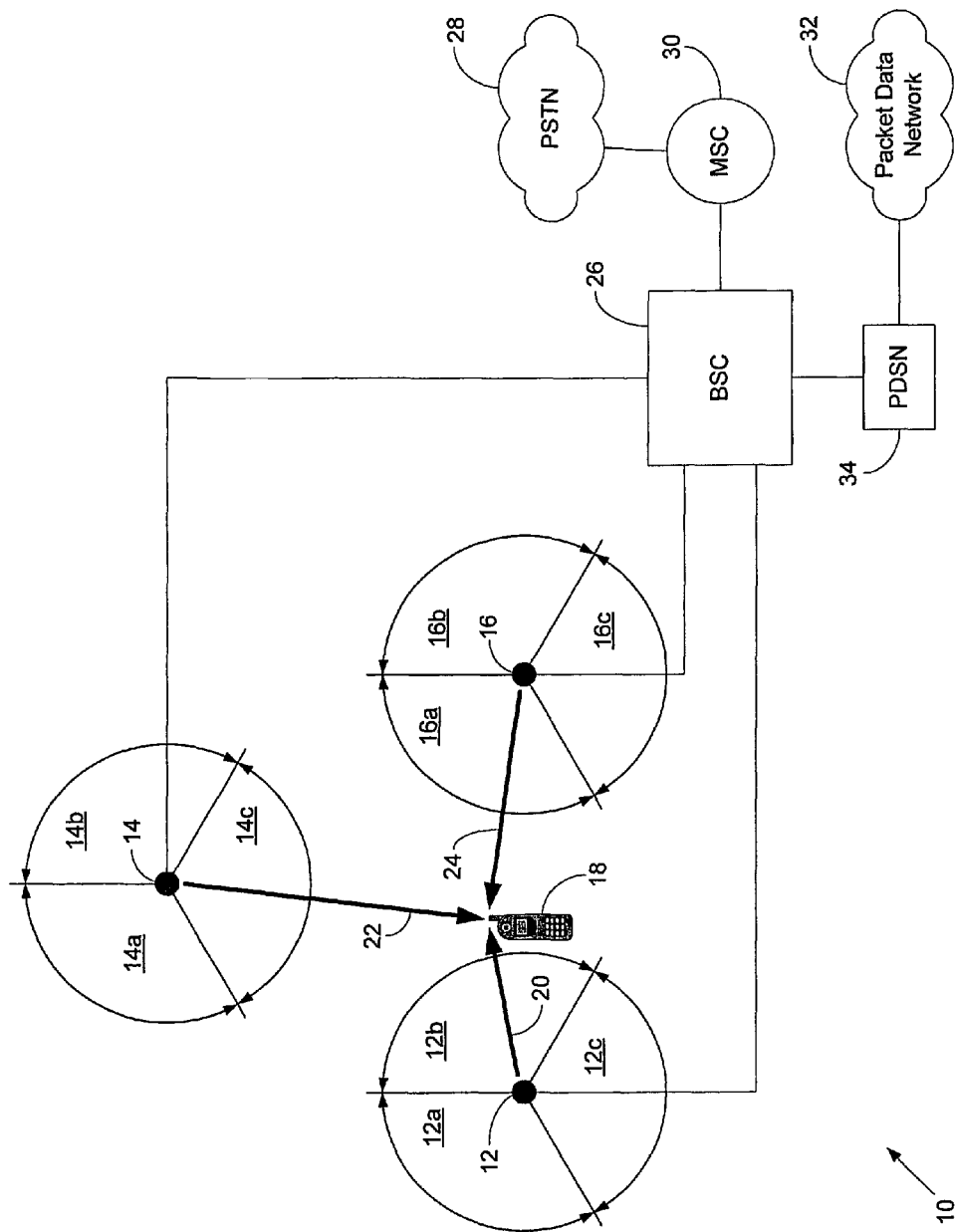
FIG. 1 is a block diagram of a spread spectrum communication system, in accordance with an exemplary embodiment.

The inventors have recognized that the use of search windows to monitor pilot signals can cause inefficiencies. In particular, a mobile station may lose a target pilot signal if the target pilot signal's PN offset at the mobile station falls outside of the search window. This can occur, for example, when the mobile station is moving at a sufficiently high speed. At high speed, the distance between the mobile station and the target transmitter (and, thus, the propagation delay associated with the target pilot signal) may change so rapidly that the target pilot signal's PN offset at the mobile station moves outside of the search window. This potential problem can be alleviated by making the search window wider. However, a wider search window also means that the mobile station may search through a greater number of phases before finding the target pilot signal. Thus, wider search windows can be undesirable because they can increase the time it takes the mobile station to find pilot signals.

To address these problems, the inventors propose the use of search windows that adapt to the mobile station's motion. For example, if the mobile station is moving toward the target transmitter that transmits the target pilot signal, the search window may be defined such that most of the search window corresponds to phases that are less than the target pilot signal's previously-measured phase. In this way, the search window may accommodate the likelihood that the target pilot signal's phase at the mobile station will be less than its previously-measured phase. On the other hand, if the mobile station is moving away from the target transmitter, the search window may be defined such that most of the search window corresponds to phases that are greater than the target pilot signal's previously-measured phase, so as to accommodate the likelihood that the target pilot signal's phase at the mobile station will be greater than its previously-measured phase.

To define the search window in this way, the mobile station may define the center point of the search window to be less than the previously-measured phase by an adjustment amount when the mobile station is moving toward the target transmitter and may define the center point of the search window to be greater than the previously-measured phase by an adjustment amount when the mobile station is moving away from the target transmitter. The adjustment amount may depend on the mobile station's speed. For example, a low speed may result in a low or a zero adjustment amount, and a greater speed may result in a greater adjustment amount.

The mobile station may determine its direction of motion and speed relative to the target transmitter by obtaining the target transmitter's location and determining how the mobile station's location relative to the target transmitter's location has changed over time. For example, the mobile station may obtain estimates of its location at various times by using the Global Positioning System (GPS) or some other positioning technology, and the mobile station may obtain the location of the target transmitter by consulting a base station almanac.

The mobile station may then use these locations to calculate its distance from the target transmitter at various times. If the distance between the mobile station and the target transmitter has decreased over time, then the mobile station's direction of motion may be characterized as toward the target transmitter. If the distance between the mobile station and the target transmitter has increased over time, then the mobile station's direction of motion may be characterized as away from the target transmitter. The speed of the mobile station may be calculated as the rate of change of the distance between the mobile station and the target transmitter.

In this way, the search window used to search for a target spread spectrum signal can shift, depending on the mobile station's direction of motion and speed, so as to be more likely to encompass the target spread spectrum signal's phase when it changes due to the mobile station's movement.

2. Exemplary Spread Spectrum Communication System

FIG. 1 illustrates an exemplary spread spectrum communication system 10 in which exemplary embodiments may be employed. System 10 includes a plurality of base transceiver stations (BTSs), exemplified in FIG. 1 by BTSs 12, 14, and 16. Each BTS may be able to wirelessly communicate with mobile stations, such as mobile station 18. Mobile station 18 could be a wireless telephone, wireless personal digital assistant, wireless e-mail device, wirelessly-equipped laptop computer, or other wireless communication device.

Each BTS may include a plurality of transmitters and a plurality of receivers (the transmitters and receivers may be integrated into transceivers) for wireless communication with mobile stations, such as mobile station 18. Moreover, each BTS may include directional antennas to define a plurality of sectors. For example, BTS 12 may define sectors 12a, 12b, and 12c, BTS 14 may define sectors 14a, 14b, and 14c, and BTS 16 may define sectors 16a, 16b, and 16c. Although FIG. 1 shows each BTS with three sectors, it is to be understood that a BTS may have a greater or fewer number of sectors. Moreover, it is to be understood that the illustration of sectors in FIG. 1 is schematic only and that FIG. 1 is not intended to illustrate the precise geographic area covered by any sector.

The wireless communication between a mobile station and a sector may occur via one or more forward link channels (for communications from a transmitter in the sector to the mobile station) and one or more reverse link channels (for communications from the mobile station to a receiver in the sector). In the case of IS-95 CDMA, the forward link channels may include a pilot channel, a sync channel, paging channels, and forward traffic channels, and the reverse link channels may include access channels and reverse traffic channels.

The signals in the forward link channels of a sector may each have a phase that is specific for that sector. That way, the mobile station can identify signals from different sectors based on phase. For example, mobile station 18 may receive a pilot signal 20 from a transmitter in BTS 12 associated with sector 12b, a pilot signal 22 from a transmitter in BTS 14 associated with sector 14c, and a pilot signal 24 from a transmitter in BTS 16 associated with sector 16a. Mobile station 18 may distinguish between pilot signals 20-24 based on their phases.

In the case of IS-95 CDMA, pilot signals 20-24 are each spread by the same "short" pseudonoise (PN) sequence, but the beginning of the PN sequence occurs at a different time offset for each of pilot signals 20-24. The time offset between the beginning of the PN sequence and a reference time, according to the "system time" used by system 10, defines the nominal phase of each pilot signal. The nominal phase may be identified as a PN offset index ranging from 0-511. In particular, the PN offset index may be used to determine the nominal phase by multiplying the PN offset index by 64 chips. However, the phases of pilot signals 20-24 at mobile station 18 will differ from their nominal phases due to transmission delays.

The transmission delay for a pilot signal may, in large part, be caused by the time it takes the pilot signal to propagate from the transmitter to the mobile station. Thus, pilot signal 20 may be associated with a transmission delay caused by the distance between BTS 12 and mobile station 18, pilot signal 22 may be associated with a transmission delay caused by the distance between BTS 14 and mobile station 18, and pilot signal 24 may be associated with a transmission delay caused by the distance between BTS 16 and mobile station 18.

As mobile station 18 moves, the transmission delays of pilot signals 20-24 may change, thereby causing their measured phases at mobile station 18 to change. For example, as mobile station 18 moves toward BTS 16, the phase of pilot signal 24 measured at mobile station 18 may decrease due to a decreased transmission delay. If mobile station 18 moves away from BTS 16, the phase of pilot signal 24 measured at mobile station 18 may increase due to an increased transmission delay.

Mobile station 18 may receive pilot signals 20, 22, and 24 at different times. For example, pilot signal 20 may be the strongest pilot signal received by mobile station 18. In that case, mobile station 18 may acquire pilot signal 20 first, and mobile station 18 may use an associated synchronization signal (e.g., a sync channel signal transmitted by sector 12b) to set the time used by mobile station 18. Mobile station 18 may include pilot signal 20 of sector 12b in its "active set," indicating that mobile station 18 is monitoring one or more paging channels of sector 12b.

Mobile station 18 may then acquire pilot signal 24 as the next strongest pilot signal. Mobile station 18 may then add pilot signal 24 to its "candidate set," indicating that pilot signal 24 is a candidate for placement in the "active set."

Mobile station 18 may subsequently identify pilot signal 22 as a target pilot signal to search for. Pilot signal 22 may be identified in a neighbor list received by mobile station 18, in which case mobile station 18 may add pilot signal 22 to its "neighbor set" once pilot signal 22 is found. Alternatively, mobile station 18 may find pilot signal 22 by scanning through PN offsets sequentially, in which case mobile station 18 may add pilot signal 22 to its "remaining set" when found.

Once mobile station 18 has acquired pilot signals 20-24, mobile station 18 may continue monitoring pilot signals 20-24. In so doing, the search windows that mobile station 18 uses to find pilot signals 20-24 may shift depending on the mobile station's direction of motion and speed, as described in more detail below.

BTSs 12, 14, and 16 may be controlled by a base station controller (BSC) 26. For example, BSC 26 may control the use of forward and reverse traffic channels for wireless communication between BTSs 12, 14, and 16 and mobile stations, such as mobile station 18. BSC 26 may also control handoffs between the sectors in its service area (i.e., sectors 12a-c, 14a-c, and 16a-c).

BSC 26 may be communicatively coupled to a circuit-switched network, such as public switched telephone network 28, e.g., via a mobile switching center 30. BSC 26 may also be communicatively coupled to a packet-switched network, such as packet data network 32, e.g., via a packet data serving node (PDSN) 34. Mobile stations, such as mobile station 18, may engage in communication sessions with various endpoints via PSTN 28 or packet data network 32, in order to exchange voice, data, or other media. For example, a mobile station may engage in a voice call with an endpoint via PSTN 28. Alternatively, a mobile station may engage in a data session with an endpoint via packet data network 32, e.g., for voice-over-packet (VoP) communication, to send or receive e-mail, to browse the World Wide Web, to receive streaming video and/or audio, to participate in Internet gaming, or for other purposes.

In operation, mobile station 18 may acquire pilot signal 20 associated with sector 12b and may include pilot signal 20 in its "active set." Thereafter, Mobile station 18 may use traffic channels associated with sector 12b for a voice call or other type of communication session. Mobile station 18 may also acquire pilot signal 24 associated with sector 16a and include pilot signal 24 in its "candidate set." In that case, mobile station 18 may subsequently use traffic channels associated with sector 16a for the communication session, for example, to effect a soft handoff. If mobile station 18 has also acquired pilot signal 22 associated with sector 14c, and has included pilot signal 22 in its "neighbor set" or "remaining set," then sector 14c may also be used for a handoff.

3. Exemplary Operation

Figure 2:
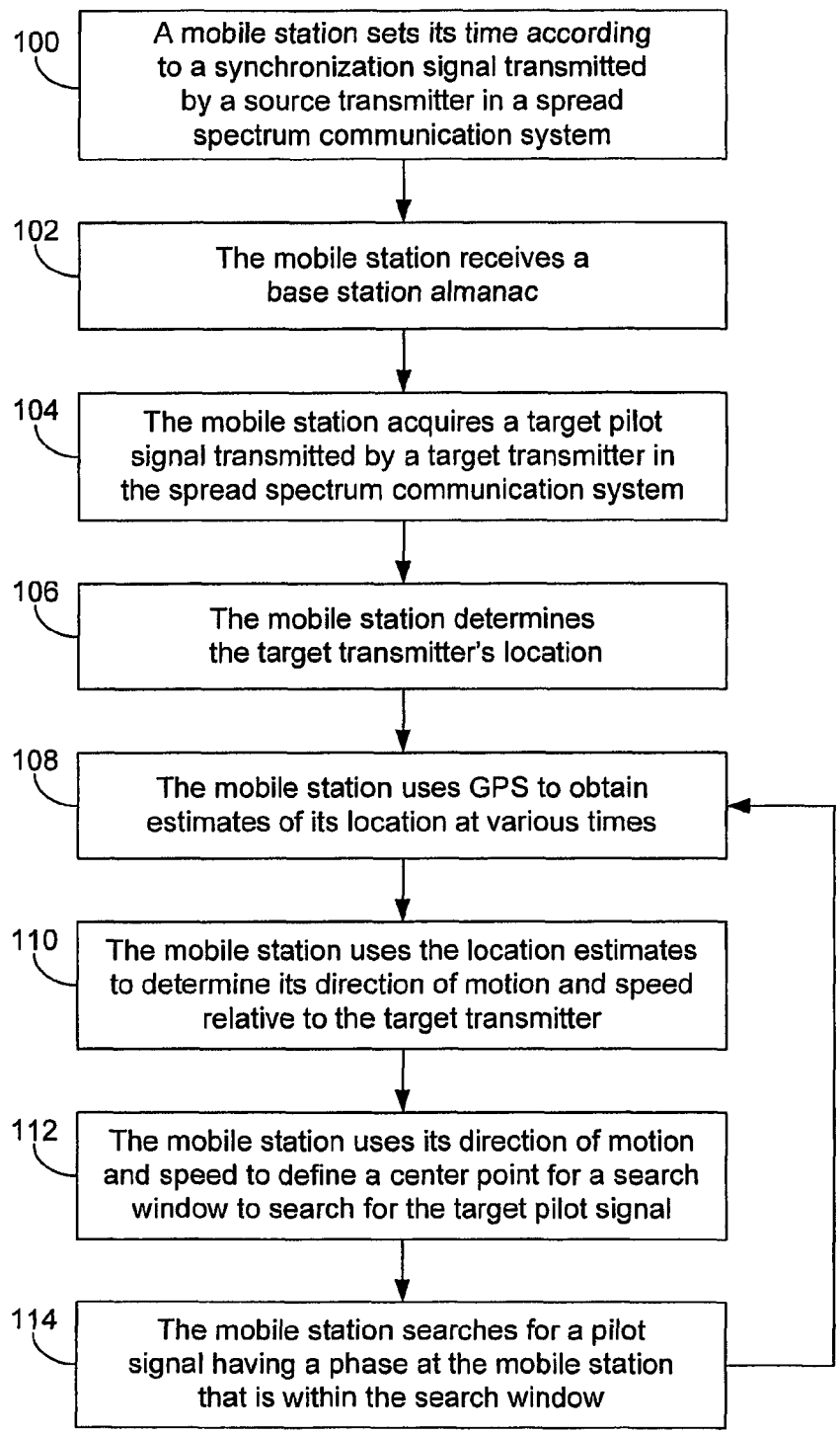
FIG. 2 is a flow chart illustrating a method of searching for a target spread spectrum signal, in accordance with an exemplary embodiment.

FIG. 2 is a flow chart illustrating an exemplary method of searching for a target spread spectrum signal transmitted by a target transmitter of a spread spectrum communication system (e.g., system 10 illustrated in FIG. 1). In this example, the target spread spectrum signal is a target pilot signal that has a nominal phase (e.g., a PN offset value) according to the system's time, and the mobile station makes an initial measurement of the target pilot signal's phase at the mobile station according to the mobile station's time. After acquiring the target pilot signal, the mobile station defines a search window to continue monitoring the target pilot, such that the center point of the search window is offset from the target pilot signal's previously-measured phase based on the mobile station's speed and direction of motion.

The method may begin when the mobile station (e.g., mobile station 18) sets its time according to a synchronization signal transmitted by a source transmitter in the spread spectrum communication system, as indicated by block 100. The source transmitter may be the transmitter that transmits the strongest pilot signal received by the mobile station. For example, the source transmitter may be the transmitter that transmits pilot signal 20 shown in FIG. 1. The synchronization signal provides information regarding a system time used by the spread spectrum communication system. Thus, in the case of IS-95 CDMA, the synchronization signal could be a sync channel signal. The mobile station then develops a mobile station time based on the synchronization signal. In this way, the mobile station may synchronize its time with the system time used by the spread spectrum communication system, subject to a transmission delay associated with the synchronization signal. The transmission delay may, in large part, correspond to the time it takes the synchronization signal to propagate from the source transmitter to the mobile station.

In this example, the mobile station also receives a base station almanac, as indicated by block 102. The base station almanac identifies the locations of transmitters in the spread spectrum communication system (or, more particularly, the locations of antennas used by the transmitters). The base station almanac may also include other information, such as the nominal PN offsets used by the transmitters. The mobile station may receive the base station almanac from the source transmitter or other transmitter in the spread spectrum communication system, either automatically or upon request by the mobile station.

At some point, the mobile station acquires a target pilot signal transmitted by a target transmitter in the spread spectrum communication system, as indicated by block 104. The mobile station acquires the target pilot signal when the mobile station successfully receives the target pilot signal and measures its phase. The phase of the target pilot signal measured by the mobile station may be different than the target pilot signal's nominal phase due to the time it takes for the target pilot signal to propagate from the target transmitter to the mobile station. The mobile station may store this phase as a previously-measured phase. The mobile station may also add the target pilot signal to its active set, candidate set, neighbor set, or remaining set, depending on its signal strength.

Once the mobile station has acquired the target pilot signal, the mobile station may define a search window to search for the target pilot signal at a later time. To define the search window, the mobile station may determine the target transmitter's location, as indicated by block 106. For example, the mobile station may consult the base station almanac to obtain the location of the antenna used by the target transmitter. Alternatively, the mobile station may determine the target transmitter's location in other ways.

The mobile station may also obtain estimates of its location at various times, as indicated by block 108. The location estimates could be obtained by using a satellite-based positioning system, such as the Global Positioning System (GPS). Alternatively or additionally, other positioning technologies could be used, e.g., Advanced Forward Link Trilateration (AFLT) or hybrid techniques. In an exemplary embodiment, the mobile station obtains at least a first location estimate at a first time and a second location estimate at a second time. The first time may correspond to the time that the mobile station initially acquired the target pilot signal, and the second time may correspond to a subsequent time.

The mobile station then uses these location estimates to determine its direction of motion and speed relative to the target transmitter, as indicated by block 110. For example, the mobile station may use the location estimates to calculate $D_1$, the distance between the mobile station and the target transmitter at a first time $t_1$, and to calculate $D_2$, the distance between the mobile station and the target transmitter at a second, later time $t_2$. The mobile station may then use $D_1$ and $D_2$ to characterize its direction of motion relative to the target transmitter as being either toward the target transmitter or away from the target transmitter. In particular, if $D_2$ is less than $D_1$ then the mobile station is moving toward the target transmitter. If $D_2$ is greater than $D_1$ then the mobile station is moving away from the target transmitter. The mobile station may calculate its speed relative to the target transmitter as the rate of change in its distance to the target transmitter. Thus, the mobile station may calculate its speed, S, using the following expression:

$$S=(D_2-D_1)/(t_2-t_1).$$

It is to be understood that the foregoing methods for estimating the mobile station's speed and direction of motion relative to the target transmitter are exemplary only. For example, the mobile station's speed and direction could be calculated from location estimates in other ways (e.g., using more than two location estimates). In addition, the mobile station could use information other than location estimates. For example, the mobile station may use velocity information obtained from GPS Doppler measurements to determine its speed and/or direction.

The mobile station uses its direction of motion and speed to define a center point of a search window used to search for the target pilot signal, as indicated by block 112. As a default, the mobile station may define the center point as the previously-measured phase of the target pilot signal. However, the mobile station may adjust the center point by an adjustment amount so as to be either greater than or less than the previously-measured phase, based on the mobile station's direction of motion and/or speed relative to the target transmitter. For example, if the direction of motion is toward the target transmitter, the mobile station may define the center point to be less than the previously-measured phase by an adjustment amount, whereas if the direction of motion is away from the target transmitter, the mobile station may define the center point to be greater than the previously-measured phase by an adjustment amount.

The mobile station may select the size of the adjustment amount based on its speed. For example, if the speed is less than a first threshold value than the adjustment amount may be zero. If the speed is greater than the first threshold value but less than a second threshold value, then a first non-zero adjustment amount may be selected. If the speed is greater than the second threshold value, then a second non-zero adjustment amount may be selected, with the second non-zero adjustment amount being greater than the first non-zero adjustment amount.

It is to be understood that the foregoing algorithm for selecting the adjustment amount is exemplary only, as other algorithms could be used. For example, a greater or fewer number of threshold values may be used to select adjustment amounts. In addition, the adjustment amount could vary continuously, rather than discretely, as a function of speed. It is also to be understood that different adjustment amounts could be used for the same speed, depending on the mobile station's direction of motion or other factors.

The effect of applying a non-zero adjustment amount is to change how much of the search window corresponds to phases that are "before" (less than) the previously-measured phase and how much of the search window corresponds to phases that are "after" (greater than) the previously-measured phase. In particular, when a zero adjustment is applied, so that the previously-measured phase is the center point of the search window, one-half of the search window is before the previously-measured phase and one-half of the search window is after the previously-measured phase.

However, if the mobile station is moving toward the target transmitter, then the adjustment amount may shift the search window so that more of the search window is before the previously-measured phase and less of the search window is after the previously-measured phase. For example, when the mobile station's speed is greater than a first threshold value and less than a second threshold value, then two-thirds of the search window may be before the previously-measured phase and one-third of the search window may be after than the previously-measured phase. The shift may be more pronounced for greater speeds. For example, when the mobile station's speed is greater than the second threshold value, then three-fourths of the search window may be before the previously-measured phase and one-fourth of the search window may be after the previously-measured phase.

If the mobile station is moving away from the target transmitter, then the adjustment amount may shift the search window so that less of the search window is before the previously-measured phase and more of the search window is after the previously-measured phase. For example, when the mobile station's speed is greater than a first threshold value and less than a second threshold value, then one-third of the search window may be before the previously-measured phase and two-thirds of the search window may be after the previously-measured phase. When the mobile station's speed is greater than the second threshold value, then one-fourth of the search window may be before the previously-measured phase and three-fourths of the search window may be after the previously-measured phase.

Although the center point of the search window may be based on the mobile station's direction of motion and speed, the width of the search window may be based on a search window size parameter that the mobile station received from the spread spectrum communication system. For example, in the case of IS-95 CDMA, the mobile station may receive a "SRCH_WIN_A" parameter that defines the search window size for the active and candidate sets, a "SRCH_WIN_N" parameter that defines the search window size for the neighbor set, and a "SRCH_WIN_R" search window that defines the search window size for the remaining set.

Once the mobile station has defined a search window for the target pilot signal, the mobile station searches for a pilot signal having a phase at the mobile station that is within the search window, as indicated by block 114. The phase at the mobile station is based on the mobile station's time, as developed from the synchronization signal of block 100. In this way, the mobile station may find the target pilot signal by searching within the search window. The phase measured in block 114 may be different than the phase measured in block 104 due to the mobile station's movement.

After finding the target pilot signal, the mobile station may continue monitoring the target pilot signal. To continue monitoring the target pilot signal, the mobile station may continue using the same search window, or the mobile station may define a new search window based on more up-to-date determinations of the mobile station's speed and direction or motion. Thus, the mobile station may obtain one or more additional location estimates (as indicated by arrow looping back from block 114 to block 108) and may use the additional location estimates to make a new determination of its direction of motion and speed relative to the target transmitter. The newly-determined speed and direction of motion may be used to define the center point of a new search window. The center point of the new search window may differ from a previously-measured phase by an adjustment amount, as discussed above. However, the mobile station may now use the phase measured in block 114 as the previously-measured phase, instead of the phase measured in block 104. In this way, the search window may continue to adapt based on the mobile station's motion.

4. Exemplary Mobile Station

Figure 3:
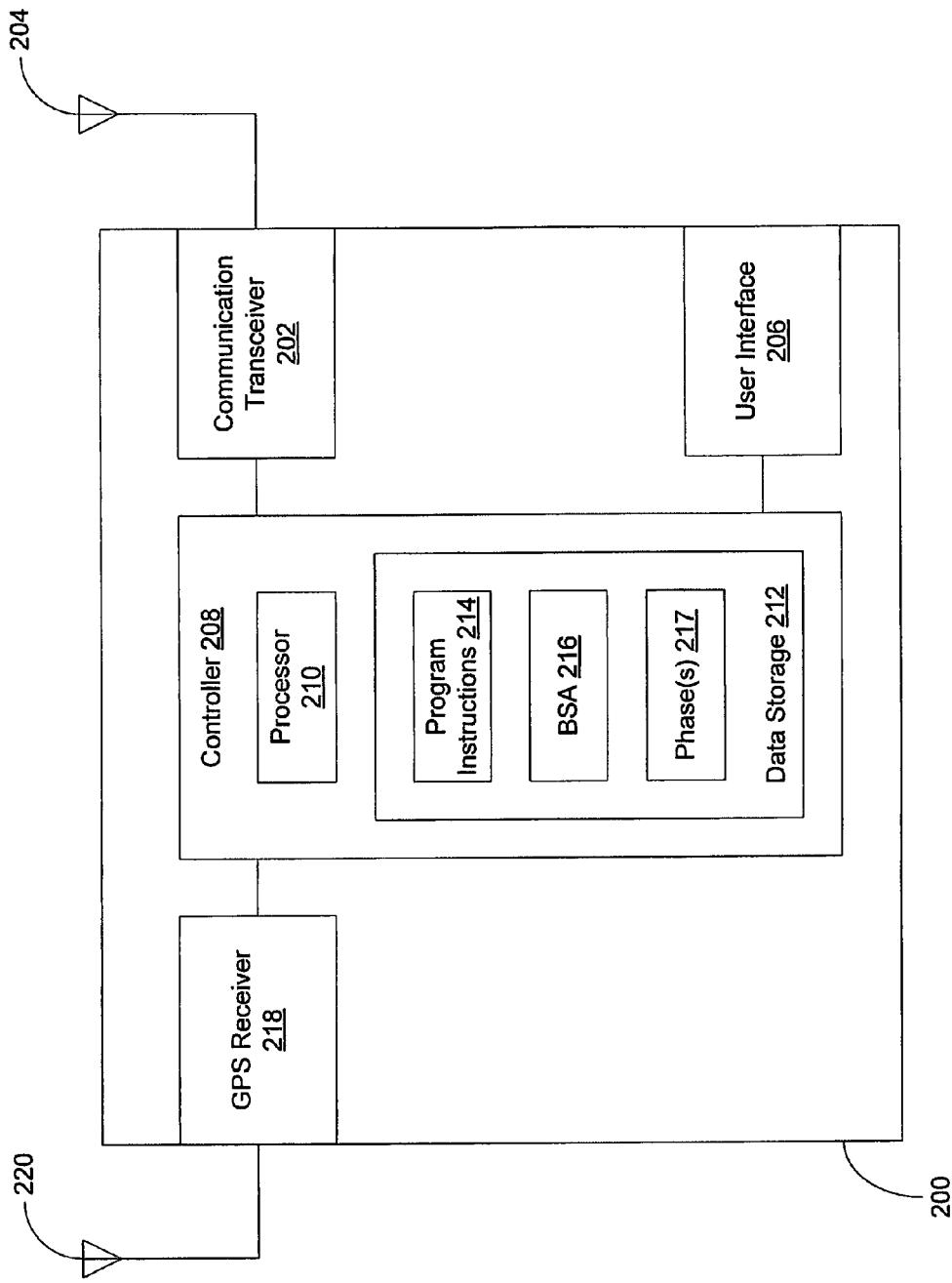
FIG. 3 is a block diagram of a mobile station, in accordance with an exemplary embodiment.

FIG. 3 illustrates an exemplary mobile station 200 that can operate in accordance with the flowchart of FIG. 2. Mobile Station 200 includes a communication transceiver 202 for communicating with one or more sectors in a spread spectrum communication system (e.g., system 10 in FIG. 1) via an antenna 204. More particularly, communication transceiver 202 may function as a transmitter for transmitting spread spectrum signals to one or more sectors and may function as a receiver for receiving spread spectrum signals transmitted by one or more sectors.

Mobile station 200 also includes a user interface 206 for obtaining input from a user of mobile station 200 and for conveying information to user. Thus, user interface 206 may include a keypad, touch screen, or other controls by which the user may provide input into mobile station 200. User interface 206 may also include a display for displaying textual, graphical, or other visual information to the user. Mobile station 200 may also be configured for voice communication. Thus, user interface 206 may include a microphone for receiving audio input from the user and a speaker for conveying audio to the user. Alternatively, mobile station 200 may communicate with an external microphone and/or speaker, for example, via a wireless connection.

The functioning of mobile station 200 may be controlled by a controller 208 coupled to communication transceiver 202 and to user interface 206. Controller 208 may comprise a processor 210 and data storage 212. Data storage 212 may include volatile and/or non-volatile memory. Data storage 212 may store program instructions 214 that are executable by processor 210 to control the functioning of mobile station 200. Data storage 212 may also store other information. For example, data storage 212 may store a base station almanac (BSA) 216. Data storage 212 may also store phase(s) 217 that mobile station 200 has previously measured for one or more pilot signals.

Program instructions 214 may be executable by processor 210 so as to cause mobile station 200 to perform the functions illustrated in FIG. 2 and described above. Thus, program instructions 214 may be executable to perform the steps of: (a) determining a direction of motion of the mobile station relative to a target transmitter (the speed of the mobile station may also be determined); (b) defining a search window, wherein the search window is defined based on at least the direction of motion and a previously-measured phase of a target spread spectrum signal (e.g., a target pilot signal) transmitted by the target transmitter; and (c) controlling communication transceiver 202 to search for a spread spectrum signal having a phase at the mobile station that is within the search window.

Mobile station 200 may determine its direction of motion and/or speed based on signals received from a satellite-based positioning system and the location of the target transmitter (which mobile station 200 may obtain by referring to BSA 216). Thus, mobile station may include a GPS receiver 218 for receiving GPS signals via an antenna 220. GPS receiver 218 may be coupled to controller 208. Program instructions 214 may be executable by processor 210 to obtain at least a first estimate of the location of mobile station 200 at a first time and a second estimate of the location of mobile station 200 at a second time, based on GPS signals received by GPS receiver 218 (a process that may also involve communicating with a position determining entity or other entity in the spread spectrum communication system).

Program instructions 214 may then be executable by processor 210 to determine the direction of motion and speed from the GPS-based location estimates and to define a center point for a search window in accordance with an algorithm, such as described above with reference to FIG. 2. Thus, the center point may be less than the previously-measured phase by an adjustment amount if mobile station 200 is moving toward the target transmitter, and the center point may be greater than the previously-measured phase by an adjustment amount if mobile station 200 is moving away from the target transmitter. The adjustment amount may be selected based on the speed of mobile station 200, for example, as described above with reference to FIG. 2. Communication transceiver 202 may then be controlled to search for a spread spectrum signal having a phase at the mobile station that is within the search window. In this way, mobile station 200 may find the target spectrum signal.

5. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method of searching for a target spread spectrum signal transmitted by a target transmitter in a spread spectrum communication system, said method comprising:
   determining a direction of motion and speed of said mobile station relative to said target transmitter;
   determining a previously-measured phase of said target spread spectrum signal, wherein said previously-measured phase was previously measured by said mobile station;
   determining that said speed is greater than a first threshold value;
   defining a search window such that a first portion of said search window is before said previously-measured phase and a second portion of said search window is after said previously-measured phase, wherein said first portion is larger than said second portion when said direction of motion is toward said target transmitter and said first portion is smaller than said second portion when said direction of motion is away from said target transmitter; and said mobile station searching for a spread spectrum signal having a phase at said mobile station that is within said search window.

2. The method of claim 1, wherein said target spread spectrum signal is a pilot signal.

3. The method of claim 2, wherein said pilot signal is spread by a pseudonoise (PN) sequence, and wherein said previously-measured phase is a time offset of said PN sequence according to a mobile station time used by said mobile station.

4. The method of claim 1, wherein defining said search window further comprises:
said mobile station receiving a search window size parameter; and
said mobile station defining a width of said search window based on said search window size parameter.

5. The method of claim 1, further comprising:
selecting said first portion and said second portion based on said speed.

6. The method of claim 5, wherein selecting said first portion and said second portion based on said speed comprises:
if said speed is greater than said first threshold value and less than a second threshold value, selecting said first portion to be a first fraction of said search window and said second fraction to be a second fraction of said search window; and
if said speed is greater than said second threshold value, selecting said first portion to be a third fraction of said search window and said second portion to be a fourth fraction of said search window, wherein said third fraction is larger than said first fraction when said direction of motion is toward said target transmitter and said third fraction is smaller than said first fraction when said direction is away from said target transmitter.

7. The method of claim 6, wherein said first fraction is two-thirds and said second fraction is one-third when said direction of motion is toward said target transmitter, and wherein said first fraction is one-third and said second fraction is two-thirds when said direction of motion is away from said target transmitter.

8. The method of claim 6, wherein said third fraction is three-fourths and said fourth fraction is one-fourth when said direction of motion is toward said target transmitter, and wherein said third fraction is one-fourth and said fourth fraction is three-fourths when said direction of motion is away from said target transmitter.

9. The method of claim 1, wherein determining said direction of motion of said mobile station relative to said target transmitter comprises:
using a satellite-based positioning system to obtain at least a first location of said mobile station at a first time and a second location of said mobile station at a second time, wherein said first time is before said second time; and
determining a target-transmitter location of said target transmitter.

10. The method of claim 9, wherein determining said direction of motion of said mobile station relative to said target transmitter further comprises:
if said second location is closer to said target-transmitter location than said first location, determining said direction of motion to be toward said target transmitter; and
if said second location is farther from said target-transmitter location than said first location, determining said direction of motion to be away from said target transmitter.

11. The method of claim 9, wherein said target transmitter is in a base transceiver station (BTS), and wherein determining a target transmitter location of said target transmitter comprises obtaining said target transmitter location from a base station almanac.

12. The method of claim 1, wherein determining said speed of said mobile station relative to said target transmitter comprises:
determining a first distance between said mobile station and said target transmitter at a first time and a second distance between said mobile station and said target transmitter at said second time.

13. The method of claim 12, wherein determining a first distance between said mobile station and said target transmitter at a first time and a second distance between said mobile station and said target transmitter at said second time comprises:
using a satellite-based positioning system to obtain at least a first location of said mobile station at a first time and a second location of said mobile station at a second time;
determining a target-transmitter location of said target transmitter;
calculating said first distance based on said first location of said mobile station and said target-transmitter location; and
calculating said second distance based on said second location of said mobile station and said target-transmitter location.

14. The method of claim 1, further comprising:
said mobile station receiving a synchronization signal from a source transmitter in said spread spectrum communication system; and
said mobile station developing a mobile station time based on said synchronization signal, wherein said mobile station measures phases of spread spectrum signals at said mobile station according to said mobile station time.

15. A mobile station, comprising:
a communication receiver for receiving spread spectrum signals;
a processor;
data storage; and
program instructions stored in said data storage and executable by said processor to perform functions comprising:
(a) determining a direction of motion and speed of said mobile station relative to a target transmitter;
(b) determining a previously-measured phase of a target spread spectrum signal transmitted by said target transmitter, wherein said previously-measured phase was previously measured by said mobile station;
(c) defining a search window based on said direction of motion and speed, wherein most of said search window is before said previously-measured phase when said direction of motion is toward said target transmitter and said speed is greater than a first threshold value, and wherein most of said search window is after said previously-measured phase when said direction of motion is away from said target transmitter and said speed is greater than said first threshold value; and
(d) controlling said communication receiver to search for a spread spectrum signal having a phase at said mobile station that is within said search window.

16. The mobile station of claim 15, further comprising a positioning receiver for receiving signals from a satellite-based positioning system.

17. The mobile station of claim 16, wherein determining said direction of motion and speed of said mobile station relative to a target transmitter comprises:
- using said positioning receiver to obtain at least a first location of said mobile station at a first time and a second location of said mobile station at a second time, wherein said first time is before said second time;
- determining a target-transmitter location of said target transmitter;
- if said second location is closer to said target-transmitter location than said first location, determining said direction of motion to be toward said target transmitter; and
- if said second location is farther from said target-transmitter location than said first location, determining said direction of motion to be away from said target transmitter.

18. The mobile station of claim 15, wherein at least two-thirds of said search window is before said previously-measured phase when said direction of motion is toward said target transmitter and said speed is greater than said first threshold value, and wherein at least two-thirds of said search window is after said previously-measured phase when said direction of motion is away from said target transmitter and said speed is greater than said first threshold value.

19. The mobile station of claim 18, wherein at least three-fourths of said search window is before said previously-measured phase when said direction of motion is toward said target transmitter and said speed is greater than a second threshold value, said second threshold value being greater than said first threshold value, and wherein at least three-fourths of said search window is after said previously-measured phase when said direction of motion is away from said target transmitter and said speed is greater than said second threshold value.

* * * * *